Aug. 21, 1962 V. VICTOR 3,049,926
MEASURING AND LEVELING VESSELS
Filed April 8, 1958 2 Sheets-Sheet 1
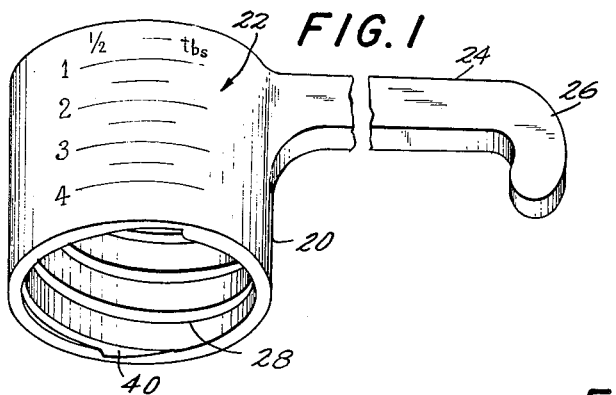
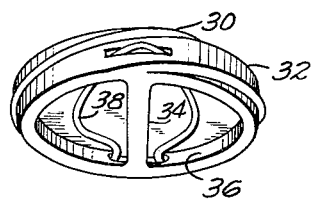
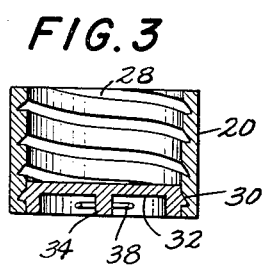
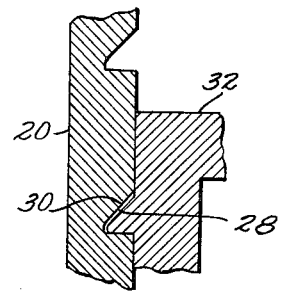
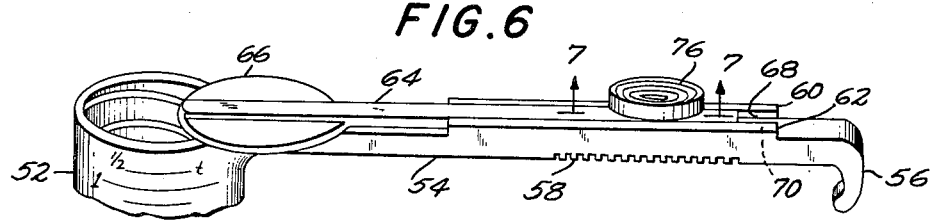
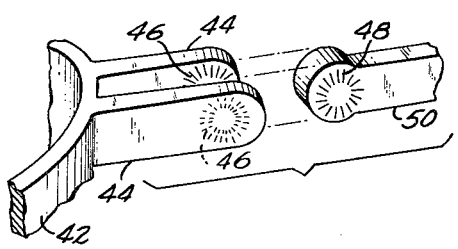
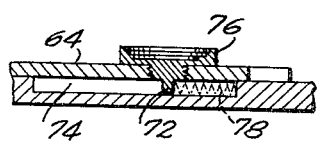
INVENTOR
VICTOR VICTOR
BY
Kane, Dalsimer and Kane
ATTORNEY Aug. 21, 1962 V. VICTOR 3,049,926
MEASURING AND LEVELING VESSELS
Filed April 8, 1958 2 Sheets-Sheet 2
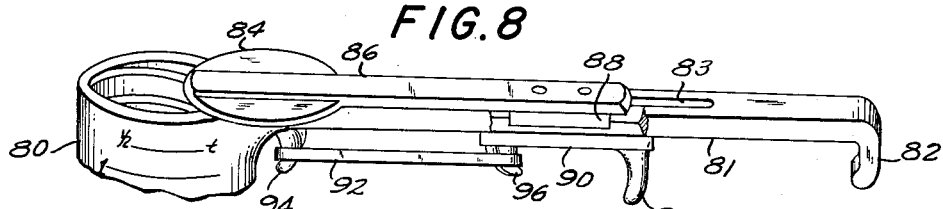
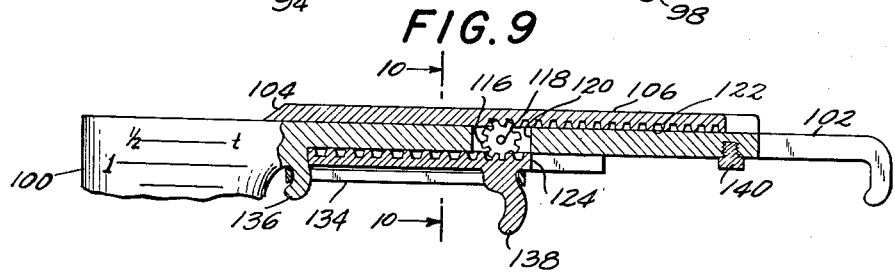
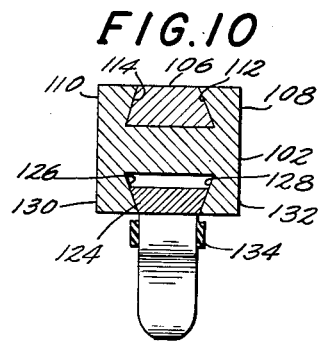
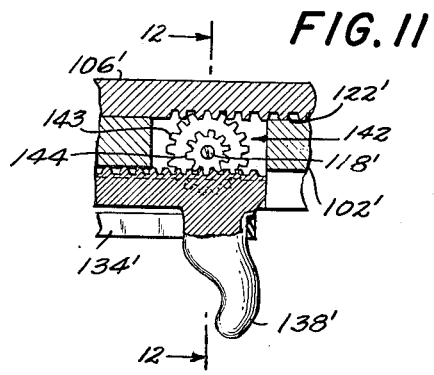
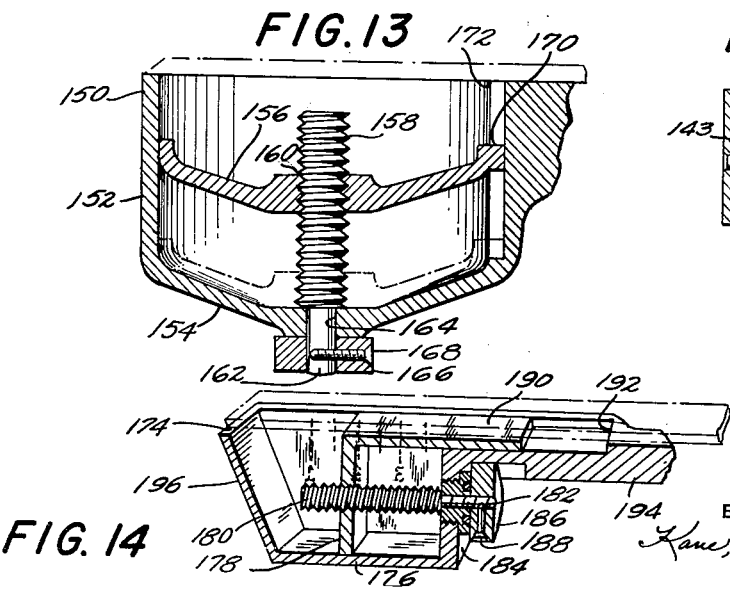
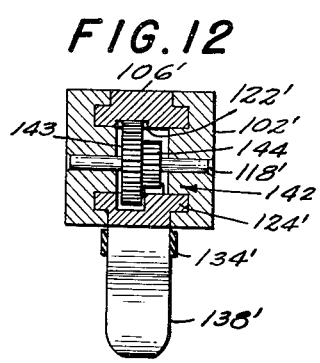
INVENTOR
VICTOR VICTOR
BY
Kane, Dalsimer and Kane
ATTORNEY

United States Patent Office 3,049,926
Patented Aug. 21, 1962

3,049,926
MEASURING AND LEVELING VESSELS
Victor Victor, Bennett Gardens 4–A, Hempstead, N.Y.
Filed Apr. 8, 1958, Ser. No. 727,085
3 Claims. (Cl. 73—429)

The present invention relates to a vessel of the kind in which the capacity is made variable by means of a movable wall and of the kind in which a leveling means insures accurate quantity control.

In the normal present-day household, restaurant kitchen and the like, dry substances such as flour, sugar, tea, coffee, detergents, seasonings, medicinal salts and powders, as well as other granular or powdered substances are "measured out" every day. Accordingly, any number and variety of measuring cups and spoons are now available, either as separate units or in graduated sets. However, heretofore there has not been any single compact instrument capable both of replacing a whole graduated set and of accurate repetitive delivery of between gradation amounts. For liquid measure, a cup or spoon-shaped scoop carrying fractional guide marks can be effectively and reliably employed, but this does not necessarily hold true for dry measure. Cups, with their vertical sides, are accurate only when filled to the brim and thereafter tapped or scraped level. Spoon-shaped scoops, because of their configuration, are not conductive to accurate dry measure without removing more than the desired content upon a leveling attempt. Further, when an attempt is made to arrive at a fractional or so-called "rounded" or "heaping" spoonful, the outcome is pure, never-twice-the-same guess-work.

A principal object of this invention is to provide an accurately adjustable instrument for dry measure which in any given size can be swiftly and easily set and kept set to dole out any precisely-desired quantity within the maximum capacity of the given size, of any dry, powdered or granulated substance.

Another extremely important object is to provide a measuring vessel of highly, accurately, and infinitely variable capacity, which is specifically adapted to easy use, within the confines of a relatively small container, in the scooping manner of a common dipper or spoon; and which remains so usable within the same size container, regardless of the vessel's capacity setting, because the means to capacity adjustment does not change the outer volume of the vessel by anything like the amount of capacity change wrought in its interior.

It is also a basically important object of the invention to provide such a vessel, or any other measuring vessel adapted to use in the scooping manner aforesaid, with a means to separate, and completely enclose, a correctly measured quantity of a dry substance from the mass of said substance from which the quantity is to be taken, before the vessel is even withdrawn from the said mass.

A further object is to provide a leveling cover for a vessel which is adapted to completely cover the vessel, thereby preventing the escape of the vessel contents after the leveling cover has terminated its leveling function.

Still another object is to provide a vessel with a leveling cover which can be manipulated with one hand while another hand holds the receptacle containing a substance to be obtained by said vessel.

An important object is to provide a vessel with an automatic leveling means, thereby increasing the speed of a leveling operation and consequently widening the range of angles at which this leveling can be safely accomplished.

Another important object is to provide a leveling means for a vessel which is adapted to be operated by a finger pull technique.

Still another important object is to provide a measuring and leveling vessel which may be easily cleaned and is relatively inexpensive, conducive to modern manufacturing techniques, and relatively simple embracing a minimum number of parts.

A vessel of this invention comprises, generally, separate but complementary parts, one of which is an adjustable scoop and another a leveling means cooperable with this scoop.

Other objects and advantages will become apparent from the following description of the invention taken in conjunction with the accompanying drawings, in which:

FIG. 1 is a perspective view of a vessel with the bottom removed and certain parts broken away, embodying the teachings of the present invention;

FIG. 2 is a perspective view of a bottom closure which may be employed to cooperate with that part of a vessel illustrated in FIG. 1;

FIG. 3 is a sectional view of the parts illustrated in FIGS. 1 and 2 after they have assumed an assembled and cooperating relationship;

FIG. 4 is an enlarged partial sectional view illustrating a contemplated arrangement of the type threads that may be employed for uniting the parts illustrated in FIGS. 1 and 2;

FIG. 5 is a fragmentary perspective view of a connection for a handle with a vessel body;

FIG. 6 is a perspective view with certain parts broken away and removed of a vessel mounting a leveling cover in accordance with the present invention;

FIG. 7 is a fragmentary sectional view of the device of FIG. 6, showing the cooperation of the leveling cover slide with the vessel handle;

FIG. 8 is a perspective view of an automatic leveling cover coupling with a vessel, with certain parts broken away and removed;

FIG. 9 is an elevational view partly in section and with certain parts broken away of another embodiment of an automatic leveling cover cooperating with a vessel;

FIG. 10 is an enlarged cross-section along the line 10—10 of FIG. 9;

FIG. 11 is an enlarged sectional view showing the employment of means for multiplying the displacement of a leveling cover for a particular displacement of a finger pull arrangement;

FIG. 12 is a cross-sectional view along the line 12—12 of FIG. 11;

FIG. 13 is an enlarged longitudinal sectional view, with certain parts broken away, of another structure capable of varying the effective internal volume of a vessel; and FIG. 14 is a sectional view in perspective of still another arrangement for varying the capacity of a measuring vessel.

In FIG. 1, a cylinder 20 is fabricated in accordance with this invention of a transparent or translucent material. For most practical applications, this material may be any of the well-known synthetic resins, now commonly referred to as "plastics," possessing the desired characteristics such as light-transparency and easy moldability.

The internal capacity of cylinder 20 may be selectively varied, depending on the contemplated use. In this regard, the maximum internal capacity can be equivalent to any given number of teaspoons, tablespoons, cups, or fractions thereof, with the maximum capacity scaled down to lesser fractions. Thus, assuming the maximum capacity of the cylinder 20 illustrated in FIG. 1 is one-fourth cup, suitable indices on the cylinder walls can denote lesser fractional parts of a cup, or the equivalent in tablespoon measurements, which tablespoon units can be further scaled down. The selected scale 22 may be applied to the walls of the cylinder 20 in any suitable manner such as etching, printing, scoring or the like.

Cylinder 20 may be formed with a handle 24 substantially similar to those employed for spoons and scoops. On the other hand, if it is desired to simply have a cup structure, handle 24 may be omitted or reduced in size to resemble a handle of a conventional cup. Handles, however, are variable at will as to length, angle, form and material. Handle 24 may accordingly be mounted integrally with cylinder 20 or independently attached thereto by means of a suitable adhesive or conventional coupling means. Thus, the handle 24 may not be of the same material as cylinder 20, and may possess desired characteristics other than those incident to the material selected for cylinder 20. A hook 26 may be formed at the free end of handle 24 to insure a firm grasp of the handle, and further, may be formed with a sufficiently hooked curvature to hang the vessel from a support, or may be provided with an aperture for reception of a post extending from this support.

Cylinder 20 has formed therein at least one internal thread 28 adapted to receive a corresponding number of projecting or external threads 30 provided on movable bottom 32, as illustrated in FIG. 2. Movable bottom 32 is substantially disk-like in main configuration and corresponds in size with the selected dimensioning of cylinder 20. The material utilized to form bottom 32 can vary and may be in the nature of one of the well-known synthetic resins or even metals. It is preferable that the upper or top edge of bottom 32 be clearly visible through the walls of cylinder 20 in order that this edge can be properly aligned with the selected indicia 22 presented by the walls of cylinder 20. If the cylinder 20 is fully transparent, the bottom 32 can be of the same material and color as this cylinder. However, a visible advantage is gained in having the bottom unit 32 of contrasting color or opacity, especially when the material selected for cylinder 20 is translucent.

Adjacent the bottom edge of bottom unit 32 is a finger-gripping projection 34 which may be integrally formed with the main body of bottom 32 or be a separately attached part. The shape selected for projection 34 can obviously be varied and the same purpose can be served by a centrally-extending knob or short staff. In the case of embodiments too small in size, to enable two fingers to be inserted between the inner face 36 of bottom unit 32, a knurl or the like is provided in this inner face 36 to provide turning purchase for only one finger.

The purpose of the invention requires that the minimum capacity of the vessel be never more than half the maximum, but it is not necessary that this minimum be, as in the shown instance, zero. Therefore, the bottom unit can, at choice, be hollowed on top, instead of underneath, thus providing a larger maximum capacity for the same height of cylinder.

In some cases, it may be desired to provide a light, setting-holding friction grip between bottom unit 32 and the inner wall of cylinder 20. In the shown unit, this is provided for by thin wire spring 38. But, where the material of the bottom unit is both resilient and durable, a better means to the same purpose can take the form of one, or more, properly shaped, flexing segments of the unit's sidewall, integral with that wall at only one end of the segment, or segments.

Referring to FIG. 3, the bottom unit 32 is inserted within the walls of cylinder 20 with the internal threads 28 of the latter meshing with the projecting thread 30 of bottom unit 32. It has been found that for most efficient and practical applications, the over-all height of the assembled vessel formed by cylinder 20 and bottom unit 32 should not exceed the outer diameter of cylinder 20.

To expedite the insertion of bottom unit 32 into cylinder 20, the terminal ends 40 of each one of the selected number of threads 28 is enlarged to provide uninhibited access for each one of the selected number of projecting threads 30. By simply turning the botom unit 32 with respect to cylinder 20, the thread or spiral means 28 and 30 provides efficiently-controlled and adjustable internal capacity for the assembled vessel. Thus, by properly mating the top edge of bottom unit 32 with the selected indicia to provide the desired internal capacity of cylinder 20, repetitive delivery of the selected quantity of granular or powdered substance is possible. Obviously, this quantity may be a fractional part of a standard unit, such as a tablespoon or teaspoon, and this quantity may be similarly supplied repeatedly.

The speed at which the vessel capacity adjustment is attained is dependent upon the particular thread arrangement presented by the internal surfaces of cylinder 20 and external surfaces of bottom unit 32. Theoretically, the rate of bottom unit advance or retreat, per single turn, is dependent only on the steepness of the thread helix. But, actually, in the case of an ordinary single thread, it is limited to the height of the bottom unit's side, because such a thread must completely encircle the unit to assure maintained perpendicularity of the unit to its axis of travel, which is indispensable to accuracy. Therefore, FIGS. 1, 2 and 3 all show use of a special double thread, which, in the shown instances, permits an advance of two whole scale units per single turn, although the height of the bottom's side is only one scale unit. Further, with such a double thread, the rate of advance could be even greater, if desired, with a bottom unit even thinner; because the opposite angling of the thread's separate segments on the unit would assure maintained perpendicularity even if those segments were relatively short. The use of such a double thread is not essential, because a single thread would still sufficiently serve the needs of the invention. But, in terms of increased setting speed, particularly, its potential advantage is substantial, and this advantage holds good for other types of adjustment by thread means to be shown later.

In FIG. 4 there is illustrated a somewhat preferred thread profile peculiarly adapted to assure both free powder spillage from the exposed portion of the female thread and no powder leakage past the male thread.

The present invention contemplates providing a measuring vessel which incorporates the teachings of the present invention with an adjustable as well as interchangeable handle. Accordingly, in FIG. 5, an example of one of the many handle-connecting structures is illustrated, wherein cylinder 42, which is substantially the same as cylinder 20, is formed with a pair of integrally-extending bosses 44 in spaced-apart relationship. The exposed faces of the bosses 44 are formed with radial knurling 46. Mating radial knurling 48 is provided on each of the opposed side walls of handle 50. Thus, when handle 50 is deliberately inserted between bosses 44, which are preferably inwardly spring-biased, by the inherent resiliency of the contemplated synthetic resins, knurling 48 will mesh with knurling 46. The spring tension of bosses 44 will interlock handle 50 through knurling 46 and 48, and when the knurled pattern is pre-calculated, the handle 50 may be set with respect to cylinder 42 at predetermined angles to the plane of the top edge of cylinder 42 for passage of a single knurl of knurling 48 with respect to a starting index associated with knurling 46. This interchangeable handle and cylinder arrangement permits a choice as to handle form, length, angle, material and color. Obviously, many structural arrangements may be resorted to in accomplishing these desirable results and for the sake of brevity, these arrangements will not be fully explored, for they are believed to be apparent to those skilled in the art. In this connection, the vessel handle may be provided with a pair of spaced bosses adapted to receive therebetween a mating extension projecting from the side walls of the vessel container. Further, a wing-nut arrangement may supplement or even replace the knurling on the mating parts.

In accordance with a preferred embodiment of this invention, a leveling cover is coupled with a measuring vessel which has extending therefrom an elongated handle. This measuring vessel may be formed from light-transparent material and may have indicia on wall portions thereof similar to that shown in FIG. 1. This measuring vessel may also include a displaceable wall for varying its internal capacity. It will be observed that a leveling and covering means is easily operable by the same hand that holds the vessel handle. Further the vessel scoop may be at any angle within the material from which a measured quantity is to be withdrawn.

Thus, in FIG. 6, a cylindrical container 52 mounts an elongated handle 54 either integrally formed therewith or as a separate part suitably attached thereto. Handle 54 terminates in a suitably formed hooked portion 56 employed to insure a firmer grasp of the handle 54 and cooperable to mount the vessel on a selected support. A knurled or roughened section 58 is formed in the bottom surface of handle 54 to provide an additional means for assuring a secure hold by a user of the measuring vessel.

A pair of upstanding guide rails 60 and 62, which may form an integral part of handle 54, present a track for extension 64 of leveling cover 66. The track provided by guide rails 60 and 62 may embody beveled internal faces 68 and 70, respectively, for slidably receiving complementary beveled faces on leveling cover extension 64. The leveling cover 66 assumes a circular configuration of sufficient diameter to completely cover the open end of container 52 and should have a leading edge capable of entering, rather than pushing, the selected dry substance.

It should be apparent that when leveling cover extension 64 is moved on the track provided by guide rails 60 and 62, leveling cover 66 can be moved completely away from the open end of container 52, or if desired, deliberately urged to a completely closed position. In order that displacement of leveling cover 66 with respect to container 52 can be controlled and limited within a desired range of travel, a stop stud 72 is provided and extends through handle extension 64 into slot 74 in handle 54, substantially as shown in FIG. 7. Slot 74 is of a predetermined length, thereby limiting the displacement of leveling cover 66 with respect to container 52 through suitable engagement by stop stud 72 with the terminal ends of this slot 74. Consequently, as in later embodiments, stops are provided for preventing the leveling cover from advancing past the fully covering position and from coming off the vessel handle.

As shown, stop stud 72 can be threadedly mounted on leveling cover extension 64 and include either integrally or as a separately associated part a thumb-gripping button 76 which facilitates the displacement of leveling cover 66 with respect to the open end of container 52. The upper face of thumb-gripping button 76 is suitably recessed or roughened, as by knurling, to increase surface friction when engaged by a user's thumb. An internal spring may be suitably associated with stop stud 72 within slot 74 to bias the leveling cover to either a completely open or closed position. A particular disposition of this spring is illustrated in phantom in FIG. 7 and is denoted by numeral 78. Depending upon the disposition of the spring, an upwardly inclined stepped thumb grip can be incorporated with the leveling cover extension structure in lieu of the thumb-gripping button. The portion of slot 74 which houses such a spring can be a hole, instead of a slot, so that stop stud 72 cannot enter it. Also, stop stud 72 can be a separately placed unit, instead of extending from operating button 76, and the opposite end of the slot can be narrowed so that, for assembly purposes, it can admit only the stud, and not the spring.

Referring now to FIG. 8, another embodiment of a measuring vessel constructed in accordance with the present invention is illustrated and may include a cylindrical container 80 which may have a displaceable wall, suitable measuring indicia, and further, may be fabricated from a light-transparent material similar to the structure illustrated in FIG. 1.

An elongated handle 81 having a hooked end 82 extends from cylindrical container 80 and may be integrally formed therewith or constitute a separately-secured member. Handle 81 is provided with an elongated slot 83 extending therethrough of sufficient predetermined length to regulate the displacement of a leveling cover 84 with respect to the open end of container 80, as will be more fully described shortly. Leveling cover 84 includes an extension 86 which mounts a stop plate 88 adapted to travel in slot 83. When this stop plate 88 contacts either end of slot 83, the open or closed position of the leveling cover 84 is conveniently determined.

A plate 90 is suitably connected to the lower end of stop plate 88 to engage the bottom face of handle 81, thereby preventing undesirable movement of leveling cover 84 with respect to container 80 while insuring proper relative sliding displacement of these parts.

In this embodiment, it is preferable that the leveling cover 84 be biased to completely cover the open end of container 80 under normal vessel non-use conditions. To accomplish this, a rubber band or other biasing means 92 is supported by a mounting stud 94 extending from handle 81 and mounting stud 96 extending from plate 90, substantially as shown. To actuate the leveling cover 84 to an open position, against the bias of rubber band 92, a trigger 98 is provided on plate 90 and is advantageously located to enable the measuring vessel user to readily manipulate the cover 84 to an open position. Thus, it will be clear that when the cylindrical container 80 is overflowing with a desired substance or completely embedded or buried in this substance, one need only release the trigger 98 from the leveling cover open position to enable the leveling cover 84 to level the contents of container 80 and ultimately completely cover the container open end. Instead of external biasing means 92, with its mounts 94 and 96, this embodiment can also have as its biasing means a spring housed within handle 81, to operate upon stop plate 88, just as the spring of FIG. 7 operates upon a stop stud.

In FIG. 9, and associated cross-sectional FIG. 10, a measuring vessel is illustrated wherein a leveling cover is maintained in an open position under the stated normal conditions and is adapted to be displaced to a closed position against a biasing means. According to this embodiment, a cylindrical container 100 is provided with a handle 102 and may embrace the material, indicia, and movable wall associated with the measuring vessel illustrated in FIG. 1. The levelling cover 104 and leveling cover extension 106 is substantially similar to leveling cover 66 and leveling cover 64 respectively, described in connection with the embodiment illustrated in FIG. 6.

In this regard, handle 102 is provided with guide rails 108 and 110 which present inner beveled faces 112 and 114 adapted to slidably receive complementary beveled faces on handle extension 106. To move the cover 104, a rack and pinion arrangement is employed including a pinion 116 rotatably mounted on a pin 118. Handle 102 is provided with a slot 120 to accommodate pinion 116, with pin 118 affixed to side wall portions of this slot 120.

The teeth of pinion 116 are adapted to mesh with the teeth of rack 122, which forms an integral part of leveling cover extension 106. Similarly, the teeth of pinion 116 are meshable with the teeth of rack 122, which presents beveled faces slidably associated with beveled faces 126 and 128 of guide rails 130 and 132, respectively, integrally extending from the bottom of handle 102.

A rubber band 134 biases the leveling cover 104 to an open position through the rack and pinion arrangement. In this connection, rubber band 134 is mounted on a stud 136 integrally extending from handle 102 and trigger 138 integrally extending from rack 124. The movement of leveling cover 104 to a completely opened or closed position is governed by the engagement of the inner end of rack 124 with stud 136 and the engagement of the other end with a stop pin 140 threadedly associated with handle 102.

Thus, when container 100 is inserted into a mass of granulated, powdered, or similar substance, the trigger 138 is pulled against the bias of rubber band 134 to move leveling cover 104 through the rack and pinion arrangement to completely level and cover the ingredient within container 100.

Referring now to FIGS. 11 and 12, provision is made to multiply the displacement of a leveling cover for a particular unit displacement of a trigger actuating means included within a structure substantially similar to that disclosed in FIGS. 9 and 10.

A dual gear 142 is rotatably mounted on a pin 118' fixed to the walls of handle 102'. The dual gear 142 includes a large gear 143 and a smaller gear 144. The teeth of large gear 143 mesh with the teeth of rack 122', which forms an integral part of a leveling cover extension 106'. The smaller gear 144 is adapted to mesh with the teeth of rack 124' provided with a slotted recess to freely accommodate the larger gear 143, substantially as shown in FIG. 12.

In this embodiment, as in all embodiments which have employed a beveled track for slide guidance, a flange-and-groove track such as shown in FIG. 12, may be substituted. In all other respects, the embodiment of FIGS. 11 and 12 is substantially the same as the embodiment of FIGS. 9 and 10, and similar parts have been denoted by corresponding primed numerals. Depending upon the ratio of gear 143 with respect to gear 144, a unit displacement of trigger 138' against the bias of rubber band 134' will be multiplied to provide the leveling cover extension 106' with a much larger relative displacement.

The finger pull trigger operated mechanisms of the latter embodiments are in some respects extremely important because positive and firmer hand gripping is afforded.

It should be obvious that to enable any standard type measuring spoon or cup of non-adjustable capacity, not only to level, but to separate and completely enclose its contents from a mass of material from which the measured quantity is to be withdrawn, with an almost instantaneous action, and while said conventional spoon or cup is still within said material, would vastly improve the efficiency of such spoon or cup over that of other such spoons or cups as heretofore constituted.

The containers of the afore-described measuring vessels may alternatively assume the configuration illustrated in FIG. 13, which, by use of a differently located thread means to adjustment, permits great variation of the container form, to the point where that form need not even be cylindrical, but can have any lateral cross-section desired, so long as its sidewalls remain parallel, through a needed distance, in the direction of the capacity changing unit's line of movement. It will be observed that container 150, instead of still lacking a fixed bottom, now has a bottom wall 154 continuous with side wall 152. This bottom wall may be shaped, as shown, for greater depth at the center than at the sides, to increase the capacity of the container without increasing the height of the side wall. Inside the container, a separate traveling wall 156, of which the underside exactly matches the inner conformation of bottom wall 154, moves up, or down, a threaded central post 158 as this post is turned within the traveling wall's threaded central bore 160. Post 158 has a journal shaft 162 which extends through bottom bore 164, and on into, or through, finger-gripping knob 166, to which it is made fast by screw 168, or other suitable means.

If the container conformation be other than cylindrical, such as oval or rectangular, then whenever knob 166 is turned, traveling wall 156 must move up or down the threaded post, because it would not itself turn in any but a cylindrical container. If, on the other hand, the container is cylindrical, then a means, such as lug 170 which can move up or down within mating wall groove 172 but not past either side of it, must be provided to keep the traveling wall from turning with the screw. It is preferable that groove 172 be placed adjacent to the handle boss, because there its presence requires no thickening of the container wall elsewhere. It is also preferable that, for non-interference purposes, the top of post 158 lie well below the top of the container.

Obviously, container 150 may be fabricated from light-transparent material and include indicia corresponding to pre-set measurements. Additionally, any one of the leveling cover arrangements illustrated in FIGS. 6 to 12 can be employed with the adjustable container of the present embodiment.

Referring now to FIG. 14, a traveling wall for adjusting the effective internal capacity of a measuring vessel container may be coupled with a container side wall. With this arrangement, a container 174 comprises an integral bottom wall 176 upon which rests a traveling wall 178. A threaded post 180 for actuating the traveling wall 178 has its integrally-extending shaft 182 projecting through and beyond end wall 184 and further suitably journaled therein. A finger-gripping knob 186 may be employed to facilitate turning of the threaded post 180.

A laterally-extending flange 190 included in the traveling wall structure functions to prevent material from being deposited behind the traveling wall and rigidifies same by traveling in a recessed portion 192 in handle 194. The other end wall 196 of container 174 may be outwardly inclined if a set minimum internal capacity for container 174 is desired. Additionally, a more efficient scooping action is possible when the outer end wall 196 is inclined. As illustrated, the indicia corresponding to the effective internal capacity of container 174 may be indicated on the side walls of container 174. Any of the leveling cover arrangements of FIGS. 6 to 12 can be utilized with the structure of FIG. 14; however, it is preferred that the leveling cover assume a configuration resembling that of the upper outer peripheral edge portions of the upper open end of the container 174, so that the leveling cover will efficiently completely cover this open end.

Although a threaded post is preferred in displacing the traveling wall, a piston rod type structure could be utilized with satisfactory results in varying the internal capacity of the measuring vessel container by transmitting linear movement to the coupled sliding wall. But this is permissible only where the extending portions of such rod would lie close to, and parallel to, a horizontal handle, because elsewhere it would probably interfere excessively with the vessel's indispensable usability, in the manner of a dipper, within a small container.

It will thus be seen that the objects set forth above among others made apparent from the preceding description are efficiently attained, and since certain changes may be made in the above constructions and techniques without departing from the scope of the invention, it is intended that all matters contained in the above description or shown in the accompanying drawings shall be interpreted as illustrative and not in a limiting sense.

I claim:

1. A measuring vessel comprising in combination: a container having an opening and having graduations thereon whereby desired amounts of substance to be contained therein may be measured; a handle extending from said container; a leveling means for said container opening; finger engaging means coupled with said leveling means for cooperating to impart movement to said leveling means to position said leveling means over said opening whereby said leveling means is adapted to move to strike off the excess substance from that in the container; and movement multiplying means coupled with said leveling means and said finger engaging means for multiplying the movement of said leveling means in response to a unit activation of said finger engaging means.

2. A vessel as defined in claim 1, wherein said container includes a selectively displaceable wall portion for adjusting the effective capacity of said container.

3. A measuring vessel adapted to being filled with a dry substance in the scooping manner of a common dipper or spoon comprising in combination: a container having portions thereof formed of light-transparent material and having a selectively displaceable wall portion for adjusting the effective capacity of said container, said container having graduations thereon whereby desired amounts of substance to be contained therein may be measured, and surfaces of said wall portion being visible through other wall portions of said container, and threaded means for cooperating to permit the wall portion to be selectively displaced, and said threaded means including a double thread, with said wall portion having a side including threads formed thereon and with said container having a wall including threads formed thereon for cooperating with the threads of said wall portion.

References Cited in the file of this patent

UNITED STATES PATENTS

| | | | |
|---|---|---|---|
| 464,393 | Scheid | | Dec. 1, 1891 |
| 1,202,101 | Read | | Oct. 24, 1916 |
| 1,226,484 | Ehrlich | | May 15, 1917 |
| 1,625,056 | Sandy | | Apr. 19, 1927 |
| 1,654,494 | English | | Dec. 27, 1927 |
| 2,080,210 | Mafra | | May 11, 1937 |
| 2,236,786 | Ayotte | | Apr. 1, 1941 |
| 2,259,504 | Wilson et al. | | Oct. 21, 1941 |
| 2,389,530 | Miner | | Nov. 20, 1945 |
| 2,459,466 | Spreen | | Jan. 18, 1949 |
| 2,521,343 | Chadwick | | Sept. 5, 1950 |
| 2,630,014 | Chester | | Mar. 3, 1953 |
| 2,793,530 | Schultz et al. | | May 28, 1957 |